(12) United States Patent
Ivanco et al.

(10) Patent No.: US 11,685,516 B2
(45) Date of Patent: Jun. 27, 2023

(54) PASSIVE GUST-LOAD-ALLEVIATION DEVICE

(71) Applicant: UNITED STATES OF AMERICA AS REPRESENTED BY THE ADMINISTRATOR OF NASA, Washington, DC (US)

(72) Inventors: Thomas G. Ivanco, Yorktown, VA (US); Patrick S. Heaney, Gloucester, VA (US); Charles Chiou, Virginia Beach, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 5 days.

(21) Appl. No.: 17/395,747

(22) Filed: Aug. 6, 2021

(65) Prior Publication Data

US 2022/0041268 A1 Feb. 10, 2022

Related U.S. Application Data

(60) Provisional application No. 63/061,961, filed on Aug. 6, 2020.

(51) Int. Cl.
*B64C 13/18* (2006.01)
*B64C 5/10* (2006.01)
*B64C 3/50* (2006.01)
*B64C 13/16* (2006.01)

(52) U.S. Cl.
CPC ............... *B64C 13/18* (2013.01); *B64C 3/50* (2013.01); *B64C 5/10* (2013.01); *B64C 13/16* (2013.01)

(58) Field of Classification Search
CPC .. B64C 13/18; B64C 3/50; B64C 5/10; B64C 13/16; B64C 13/0427
See application file for complete search history.

(56) References Cited

U.S. PATENT DOCUMENTS

| 4,175,721 A * | 11/1979 | Lempa, Jr. | ............. B64C 13/30 |
| | | | 244/233 |
| 6,360,997 B1 * | 3/2002 | Saiz | ......................... B64C 9/10 |
| | | | 244/210 |
| 2006/0169848 A1 * | 8/2006 | Libby | ....................... B64C 9/06 |
| | | | 244/216 |

(Continued)

*Primary Examiner* — Rodney A Bonnette
(74) *Attorney, Agent, or Firm* — Robin W. Edwards; Trenton J. Roche (57) ABSTRACT

A passive gust load alleviation device for an aerodynamic panel includes a free-floating aerodynamic control surface connected to the panel via a revolute joint. A counterweight is connected to the control surface. Relative to a direction of ambient airflow, the counterweight has a center of gravity forward of the axis of rotation. The counterweight is configured to passively deflect the control surface about the axis to alleviate a gust load. A vehicle includes an aerodynamic panel connected to a body and extending into ambient airflow, and the control surface and counterweight. A method for alleviating the gust load on an aircraft panel includes connecting the control panel, via the revolute joint, along a trailing edge of the panel, and during a flight of an aircraft having the panel, passively deflecting the control panel about the axis in response to an incident wind gust.

20 Claims, 5 Drawing Sheets

(56) References Cited

U.S. PATENT DOCUMENTS

| | | | | |
|---|---|---|---|---|
| 2016/0355260 | A1* | 12/2016 | Herber | B64D 45/00 |
| 2018/0043994 | A1* | 2/2018 | Baran | G01C 23/00 |
| 2018/0334244 | A1* | 11/2018 | Cherepinsky | B64C 13/18 |
| 2021/0070427 | A1* | 3/2021 | Lampazzi | B64C 13/0423 |
| 2021/0276696 | A1* | 9/2021 | Leon | B64C 5/08 |
| 2021/0380219 | A1* | 12/2021 | Heeringa | B64C 27/26 |

* cited by examiner

PASSIVE GUST-LOAD-ALLEVIATION DEVICE

CROSS-REFERENCE TO RELATED PATENT APPLICATION(S)

This patent application claims the benefit of and priority to U.S. Provisional Patent Application Ser. No. 63/061,961, filed on Aug. 6, 2020, the contents of which are hereby incorporated by reference.

ORIGIN OF THE INVENTION

The invention described herein was made in part by employees of the United States Government and may be manufactured and used by or for the Government of the United States of America for governmental purposes without the payment of any royalties thereon or therefor.

INTRODUCTION

Aerodynamic panels are used on a host of airborne and surface vehicles in order to achieve a desired level of stability and aerodynamic response. For instance, performance race cars or hydroplane boats often incorporate aerodynamic panels to generate a downforce for the purpose of maintaining contact with a ground or water surface. In airborne applications, fixed-wing cargo planes and passenger aircraft include aerodynamic panels in the form of fuselage-mounted wings and vertical and horizontal stabilizers, with the stabilizers being incorporated into a tail-mounted empennage assembly. The wings and stabilizers in turn are equipped with primary and secondary flight control surfaces.

Further with respect to winged aircraft, exemplary primary flight control surfaces include ailerons, flaperons, elevators, and rudders, all of which are collectively responsible for controlling aerodynamic lift and drag, as well as pitch, yaw, and roll moments of the fuselage. Aerodynamic control over the aircraft while in flight is refined by pilot-initiated or autonomously-commanded control of secondary flight control surfaces such as wing flaps, spoilers, and slats. The various primary and secondary flight control surfaces work in concert to provide an optimal level of aerodynamic stability and performance during all stages of flight.

SUMMARY

Disclosed herein are passive gust load alleviation (PGLA) devices for use with an aerodynamic panel, e.g., the wings and stabilizers noted above in a non-limiting exemplary winged aircraft, as well as methods for constructing and methods for using such devices. As appreciated in the art, aircraft and other terrestrial or marine vehicles in motion often experience transient or sustained wind gusts. The incident wind gusts impart an associated gust load on the affected aerodynamic panel(s). Depending on the severity and suddenness of onset of the wind gust, the resulting gust load can pose problems for ride quality or structural loads, and can adversely affect overall aerodynamic control.

The present solutions are therefore intended to alleviate such gust loads without resorting to sensor-based active load detection and actuator-based load reduction. Instead, each PGLA device relies on purely passive deflection of a free-floating counterweighted aerodynamic control surface, e.g., an aileron or flaperon in the above-noted exemplary aircraft application. As a result, incident gust loads are quickly and effectively reduced without requiring time consuming intervention by a computer and/or active gust load alleviation (GLA) devices.

More particularly, an aerodynamic control surface that is integrated with or mounted to the aerodynamic panel deflects in response to an impulsive wind gust, and does so to an angular degree that is sufficient for aerodynamically opposing resulting structural motion of the aerodynamic panel. As the present solutions are characterized by the absence of active sensor-based wind gust detection and alleviation hardware, this effectively eliminates problems associated with signal latency and hysteresis, along with the resulting time lag between onset of a gust load and a subsequent active control response. Moreover, operator control of the aerodynamic control surface can be maintained in certain embodiments via the use of a servo tab, which may be connected to the free-floating aerodynamic control panel. Selective position control of the servo tab, via control inputs (electronic and/or mechanical), ultimately deflects the free-floating control surface to help maintain a desired level of aerodynamic control apart from the disclosed passive wind gust alleviating actions described herein.

In a non-limiting exemplary configuration, the PGLA device includes a free-floating aerodynamic control surface that is operatively connected to an aerodynamic panel via a revolute joint, e.g., one or more elongated rotary hinges. A counterweight is operatively connected to the control surface and has a center of gravity (COG) located forward of an axis of rotation of the revolute joint. This configuration and forward placement enables the control surface to passively deflect about the axis of rotation to instantly alleviate transient or sustained gust loads on the aerodynamic panel, and ultimately on a vehicle body connected thereto.

In an aspect of the disclosure, the aerodynamic panel is a wing section or segment of a wing of a fixed aircraft. The aerodynamic control surface in this representative embodiment is an aileron, or another free-floating trailing-edge aerodynamic surface of the wing section, such as but not limited to a flaperon, which may extend a portion or all of the span of the wing (i.e., the wingspan) in some configurations. The aerodynamic panel may be alternatively configured as a tail panel of an empennage assembly, i.e., a horizontal or vertical stabilizer, in which case the aerodynamic control surface could be alternatively embodied as an elevator or a rudder of the tail panel.

The PGLA device may optionally include a controllable servo tab connected to or along a trailing edge of the free-floating aerodynamic control surface. The servo tab in such an embodiment is configured to selectively impart an aerodynamic moment to the control surface in response to electronic and/or mechanical control inputs, e.g., in response to an electronic control signal from a processor, such as of an electronic control unit located aboard a representative winged aircraft. In such an embodiment, pilot control of the control surface is retained while simultaneously enabling the PGLA device to passively reduce gust loads on the aerodynamic panel.

The PGLA device when equipped with the controllable servo tab may also include an actuator having a dynamic output state that is responsive to the above-noted electronic control signal, and one or more mechanical linkages connected to the actuator and servo tab. The actuator in such a configuration is configured to transmit torque or linear forces to the servo tab to cause the servo tab to deploy relative to ambient airflow, and to thereby impart the aerodynamic moment. In such an embodiment, active modal suppression can be used to augment the effectiveness of the PGLA device(s), further improving ride quality and reducing dynamic loads.

In certain embodiments, an actuator housing may be positioned within a cavity defined by or within the aerodynamic panel, e.g., an aircraft wing section, with the actuator housing containing the actuator therein.

A rotary spring may be optionally coupled to the revolute joint and configured to provide a frequency response. The frequency response in such an embodiment is tuned or tunable to a predetermined oscillating frequency of the aerodynamic panel, which is theorized herein to enhance effectiveness by providing passive modal suppression.

A vehicle is also disclosed herein. According to an aspect of the disclosure, the vehicle includes an aerodynamic panel connected to a vehicle body and extending into an ambient airflow about the vehicle body, a revolute joint connected to the aerodynamic panel and having an axis of rotation, a free-floating aerodynamic control surface operatively connected to the aerodynamic panel via the revolute joint, and a counterweight. The counterweight is operatively connected to the control surface, and has a center of gravity located forward of the axis of rotation. The counterweight is configured, by virtue of its mass and placement relative to the axis of rotation, to passively deflect the control surface about the axis of rotation in response to a wind gust to thereby alleviate a gust load on the aerodynamic panel.

Also disclosed herein is a method for alleviating a gust load on an aircraft panel. The method according to a representative embodiment includes connecting a free-floating aerodynamic control surface, via a revolute joint, along a trailing edge of the aircraft panel. The free-floating aerodynamic control surface has an integral or connected counterweight with a center of gravity located forward of an axis of rotation of the revolute joint. During flight of a winged aircraft having the aforementioned aircraft panel, the method includes passively deflecting the control surface about the axis of rotation in response to an incident wind gust to thereby alleviate the gust load on the aircraft panel.

These and other features, advantages, and objects of the present disclosure will be further understood and appreciated by those skilled in the art by reference to the following specification, claims, and appended drawings.

DETAILED DESCRIPTION

The present disclosure may be embodied in many different forms. Representative examples are shown in the various drawings and described in detail below, with the understanding that the described embodiments are an exemplification of the disclosed principles, and not limitations of the broad aspects of the disclosure. To that end, elements and limitations described below, but not explicitly set forth in the claims, should not be incorporated into the claims, singly or collectively, by implication, inference, or otherwise. Moreover, the drawings discussed herein may not be to scale, and are provided purely for instructional purposes. Thus, the specific and relative dimensions shown in the Figures are not to be construed as limiting.

Additionally, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Singular terms such as "a" and "an" mean "at least one" or "one or more", again unless otherwise specified. Lastly, directional adjectives and adverbs, such as fore, aft, inboard, outboard, starboard, port, vertical, horizontal, upward, downward, front, back, left, right, etc., may be with respect to a forward direction of travel of a vehicle.

Figure 1:
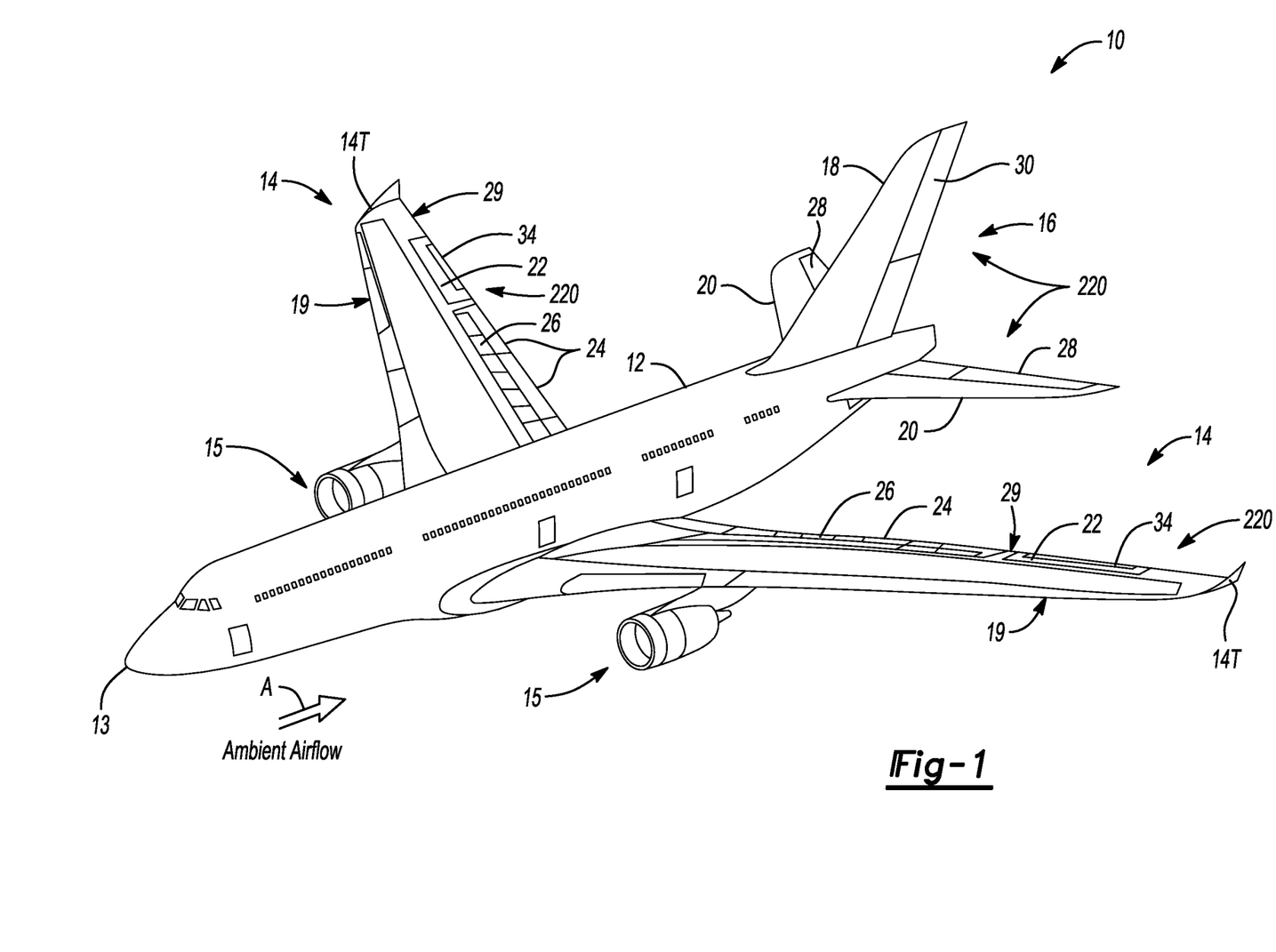
FIG. 1 is an illustration of a representative winged aircraft having a passive gust load alleviation (PGLA) device constructed in accordance with the present disclosure.

Referring to FIG. 1, a vehicle 10 according to a non-limiting exemplary embodiment of a winged aircraft is depicted as having a vehicle body 12. While the present teachings are not limited to airborne applications in general or winged airplanes in particular, the vehicle 10 is described herein for the purpose of illustrative consistency as being in the representative form of the illustrated dual/fixed-wing aircraft. For clarity, therefore, the depicted aircraft is referred to hereinafter as the winged aircraft 10, and the vehicle body 12 is referred to below as a fuselage 12, without limiting the present teachings. That is, applications may exist in which the present aerodynamic solutions could be applied to benefit operation of terrestrial or marine vehicles exposed to the problem of wind gust loading, with such solutions tailored to the differently structured vehicle bodies and operating parameters of such vehicles.

The winged aircraft 10 includes one or more wings 14, with each of the wings 14 extending radially from and attached to the fuselage 12 and terminating in a respective wingtip 14T. In the illustrated representative configuration, the aircraft 10 is embodied as a commercial transport or passenger airplane, and thus is equipped with multiple jet engines 15, e.g., turbofans, propellers, or other propulsors providing application-suitable levels of thrust. A forward end of the fuselage 12 terminates in a crew cabin 13, while an oppositely disposed aft end of the fuselage 12 is coupled to an empennage assembly 16.

Within the scope of the present disclosure, the winged aircraft 10 includes one or more passive gust load alleviation (PGLA) devices 220 for a respective aerodynamic panel 140, which in a non-limiting representative embodiment is a wing section (see FIG. 2) of a corresponding one of the wings 14 shown in FIG. 1. Thus, the wing sections described below are referred to interchangeably with the aerodynamic panel 140 as the wing section(s) 140 for clarity, without limiting embodiments of the aerodynamic panel 140 to structure of the wings 14. For instance, the aerodynamic panel 140 equipped with the PGLA device 220 may be a tail panel of the empennage assembly 16, e.g., a vertical stabilizer 18 and/or a horizontal stabilizer 20.

As the representative winged aircraft 10 of FIG. 1 is in motion, particularly during flight but to a lesser extent while taxiing on a runway surface, ambient airflow (arrow A) passes around the fuselage 12, over and under each of the wings 14, and around the empennage assembly 16. Relative to the ambient airflow (arrow A), the wings 14 have a leading edge 19 and a trailing edge 29. Various aerodynamic control surfaces are arranged on the wings 14, including free-floating ailerons 22, flaperons, etc., located proximate the trailing edge 29 at an outboard location relative to the fuselage 12. The ailerons 22 may be equipped with actively controllable servo tabs 34 as described below. Inboard of the depicted ailerons 22, the wings 14 may also be equipped with additional aerodynamic control surfaces such as flaps 24 and spoilers 26. Similarly, the empennage assembly 16 located at the tail of the winged aircraft 10 includes aerodynamic control surfaces in the form of a rudder 30 and elevators 28, either or both of which may be equipped with the PGLA device 220 as indicated in FIG. 1.

Figure 2:
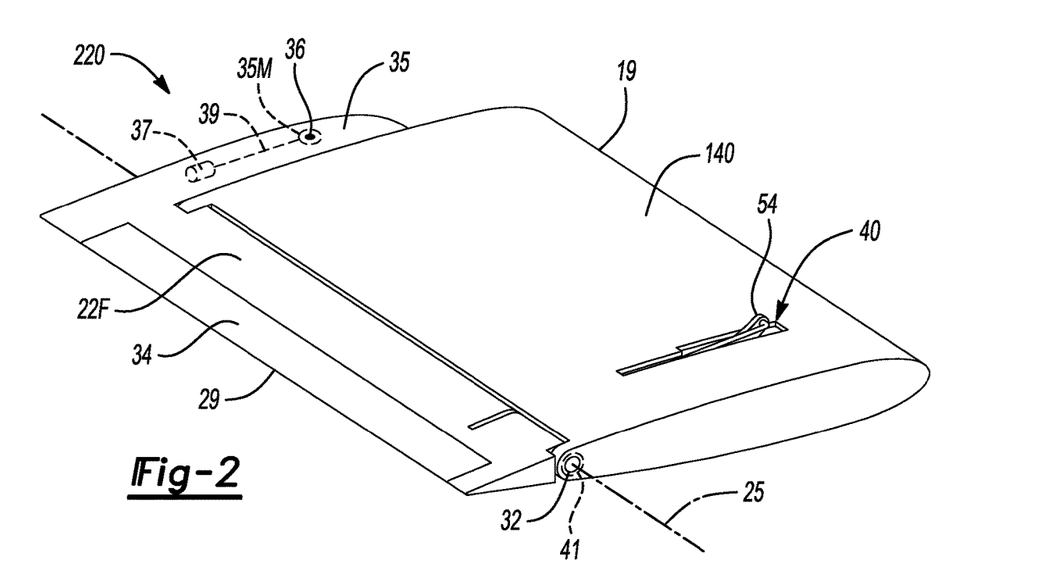
FIG. 2 is a perspective view illustration of an exemplary wing section of the aircraft shown in FIG. 1, with the wing section equipped with the PGLA device described herein.

Referring to FIG. 2, the passive gust load alleviation (PGLA) device 220 is shown in a non-limiting exemplary configuration as being connected to or integrated into the above-noted wing section 140. The aileron 22 of FIG. 1, which is located proximate the trailing edge 29 as noted above, is connected to the wing section 140 via a revolute joint 32, with the revolute joint 32 having an axis of rotation 25. For example, the revolute joint 32 may be embodied as one or more elongated rotary hinges, or another application-suitable rotary axial connection mechanism allowing the aileron 22 of FIG. 1 to freely deflect about the axis of rotation 25 in response to incident wind gusts. Thus, the aileron 22 of FIG. 1 may be configured as a free-floating aerodynamic control surface 22F operatively connected to the aerodynamic panel 140, in this instance the wing section, via the revolute joint 32. Teachings related to the non-limiting exemplary configuration of FIG. 2 are likewise extendable to panels of the empennage assembly 16 of FIG. 1 or other portions of the wings 14, as will be appreciated by those skilled in the art.

Additionally, the PGLA device 220 shown in FIG. 2 includes a counterweight 35 having a center of gravity 36, with the counterweight 35 being operatively connected to the free-floating aerodynamic control surface 22F. In different configurations, the counterweight 35 may be integrally formed with the free-floating aerodynamic control surface 22F. For instance, the counterweight 35 may be arranged approximately normal to/at right angles with respect to the axis of rotation 25 and the free-floating aerodynamic control surface 22F. Such an arrangement may have particular utility when the free-floating aerodynamic control surface 22F embodies a free-floating flight control surface such as the aileron 22, flaperon, etc., extending toward or terminating at the wing tip 14T of FIG. 1. Alternatively, the counterweight 35 may be connected to the free-floating aerodynamic control surface 22F, such as by being suspended below the wing section 140, e.g., cantilevered to the free-floating aerodynamic control surface 22F.

The collective mass of the counterweight 35 and the relative position of its center of gravity 36 with respect to the axis of rotation 25 can be calibrated offline based on the size, weight, and configuration of the winged aircraft 10 of FIG. 1. In a possible alternative embodiment, the counterweight 35 could be equipped with a moveable mass 35M, with the moveable mass 35M being translatable with respect to the axis of rotation 25. By way of an illustrative example, in the event the present teachings were to be combined with active detection of wind gust loads, e.g., using one or more accelerometers mounted to or housed within the winged aircraft 10, extended periods of high loading could trigger automatic or pilot-commanded relocation of the moveable mass 35M, e.g., via a rotary or linear actuator 37 and a control arm 39 coupled to the moveable mass 35M, for instance a motorized ball screw assembly, in order to adjust the center of gravity 36 closer to or farther away from the axis of rotation 25 as needed. Such a moveable mass 35M could freely slide on or between fixed rails or tracks (not shown).

Relative to a direction of the ambient airflow (arrow A of FIG. 1) across the wing section 140 or other similarly equipped aerodynamic panel, the center of gravity 36 is located forward of the axis of rotation 25, i.e., a predetermined fixed or adjustable distance toward the leading edge 19. This enables the collective mass of the counterweight 35 to passively deflect the free-floating aerodynamic control surface 22F about the axis of rotation 25 to alleviate a gust load. Also visible in FIG. 2 is a portion of a crankshaft 54, which is just visible through an optional slot 40 in the wing section 140, with the crankshaft 54 used in some embodiments to actuate the servo tab 34. Other embodiments may be envisioned in which the crankshaft 54 or other actuation mechanisms are fully contained within the wing section 140.

The construction of the PGLA device 220 in the various non-limiting embodiments shown in FIGS. 2-7 and described below provides a passive mechanical solution to the gust load alleviation problem. Because the solution provided herein is passive and mechanical in nature, there is no discernable lag between a gust input and the counter response of the deflecting PGLA device 220. Furthermore, a computer and associated software is not required for beneficial operation, nor do the present solutions require laser emission from the winged aircraft 10 in the instance of LiDAR-based gust detection. Instead, the contemplated PGLA device 220 is realized as a free-floating control surface 22F with a predetermined mass offset, provided by the counterweight 35, such that the center of gravity 36 is located forward of the axis of rotation 25.

By way of an illustration, when the wing 14 of FIG. 1 is impacted by a sudden and substantial wind gust, the physics of the encounter will force the free-floating control surface 22F to deflect immediately. Deflection occurs in a direction that causes an opposing aerodynamic force on the wing 14, as will be appreciated by those skilled in the art. To achieve useful reductions in gust loads, example embodiments of the free-floating control surface 22F may be implemented as the aileron 22 of FIG. 1 extending about 25% of a span of the wing 14. Increased load reductions may be possible using an elongated embodiment of such an aileron 22, one extending farther along the wing 14, such as up to 70-90% or more of the wingspan. As active control via the servo tabs 34 remains a possibility, a synergistic effect is realized by combining active control of the servo tabs 34 with passive deflection of the free-floating control surface 22F, with the free-floating control surface 22F in this representative instance being the aileron 22.

Still referring to FIG. 2, in an optional modification the PGLA device 220 may include a rotary spring 41 coupled to the revolute joint 32. The rotary spring 41 may be variously embodied as a coil spring, a 3-plane spring system, a flexible pivot spring, a lattice coupling, etc., with one example being a C-FLEX spring and slider commercially available from C-FLEX BEARING CO., INC., of Frankfort, N.Y. The rotary spring 41 may be configured to provide a frequency response tuned to a predetermined oscillating frequency of the aerodynamic panel, e.g., the wing section 140 or the wing 14. For instance, one may measure a steady-state oscillating frequency of the wing 14 offline, e.g., 5-10 Hz out-of-plane, 10-15 Hz torsional, and 15-20 Hz in-plane frequency by way of a non-limiting illustration, and then equip the PGLA device 220 with a rotary spring 41 having the requisite characteristics for damping or offsetting such frequencies. Baseline acceleration may be reduced beforehand in such a manner, thereby reducing the load ultimately experienced the PGLA device 220 in operation.

Figure 3:
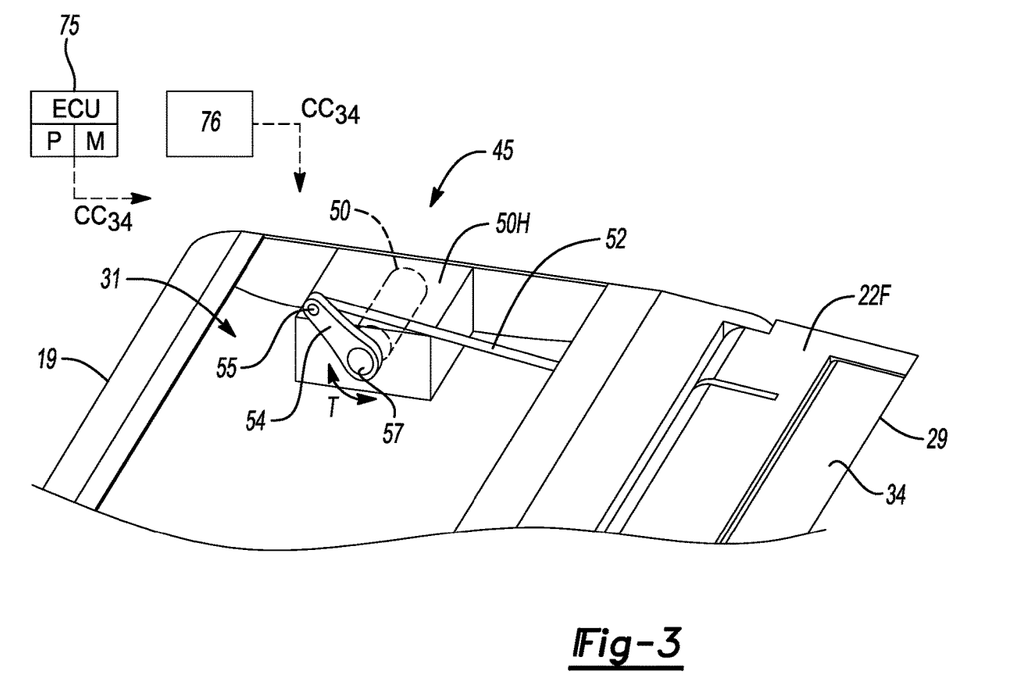
FIG. 3 is a perspective view illustration of an embodiment for housing an optional servo tab actuation mechanism within the representative wing section shown in FIG. 2.

Referring briefly to FIG. 3, use of the passive gust load alleviation (PGLA) device 220 does not preclude aerodynamic controllability of the equipped free-floating aerodynamic control surface 22F, still exemplified as the aileron 22 of FIG. 1. To that end, the servo tab 34 may be optionally servo-controlled via a control mechanism 45 housed within a cavity 31 defined by the wing section 140. The servo tab 34 in such an embodiment is configured to selectively impart an aerodynamic moment to the free-floating control surface 22F in response to control input(s), e.g., an electronic control signal (arrow $CC_{34}$) from a processor (P), e.g., of an electronic control unit (ECU) 75 having sufficient computer-readable memory (M), and/or directly from an input device 76, such as a pilot-controlled servo wheel or other human-machine interface. In alternative embodiments, the servo tab 34 could be deflected by push-pull tubes and/or cables from the pilot, in which case no actuator or processor is required. A basic implementation of the present teachings on larger aircraft equipped with hydraulics may require actuators. Such hydraulics may or may not be controlled by a processor (i.e., fly-by-wire), or the hydraulics may be used to boost actuators to mechanical linkages.

Figure 4:
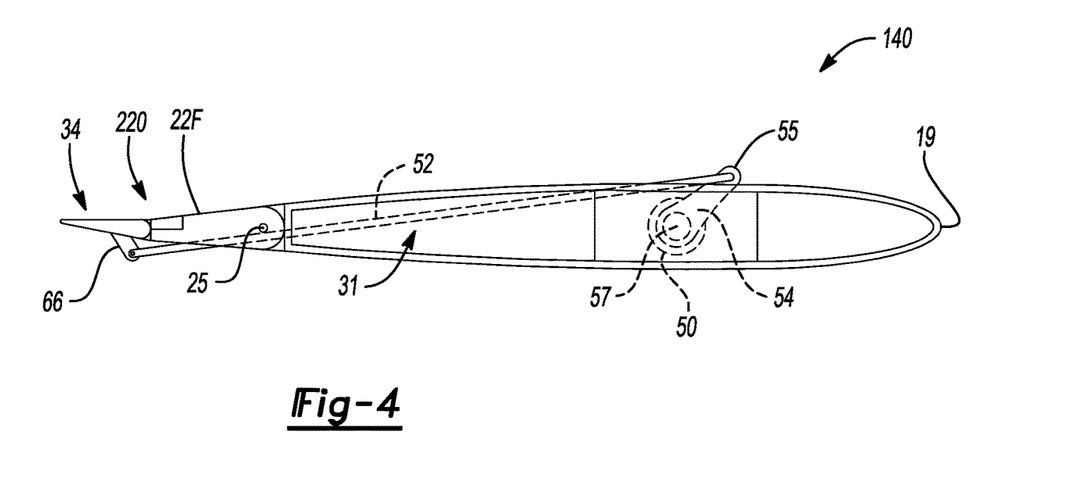
FIGS. 4 and 5 are perspective view illustrations of the wing section shown in FIGS. 2 and 3, respectively, according to an established attitude of the PGLA device.
Figure 6:
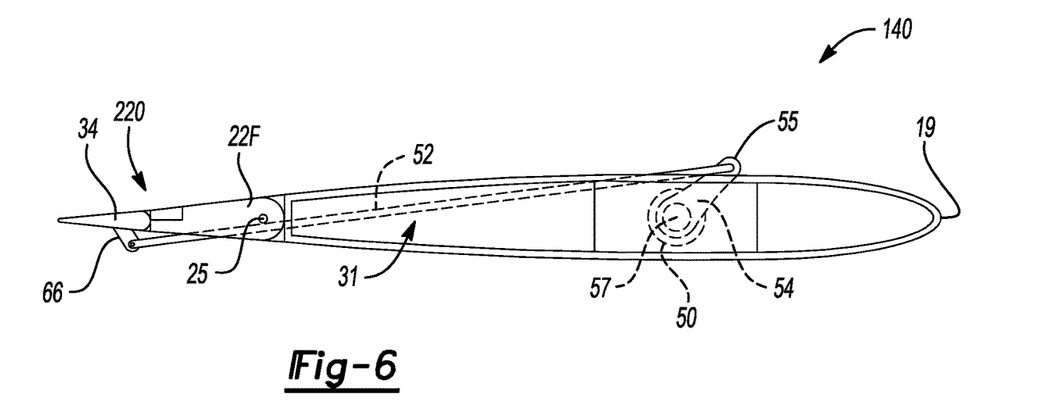
FIGS. 6 and 7 are perspective view illustrations of the wing section shown in FIGS. 4 and 5, respectively, according to another established attitude of the PGLA device.

In the illustrated non-limiting exemplary configuration, an actuator 50, e.g., a rotary or linear actuator, has a dynamic output state that is responsive to the electronic control signal (arrow $CC_{34}$). Opposing ends of a mechanical linkage 52 are respectively connected to the actuator 50 and to the servo tab 34, e.g., via a connecting linkage 66 and pivot axis 65 as shown in FIGS. 4 and 6, with the mechanical linkage 52 being configured to transmit drive torque (double-headed arrow T) from the actuator 50 to the servo tab 34. This action sets a position of the servo tab 34 to allow the servo tab 34 to impart the aerodynamic moment to the aerodynamic panel, in this instance the wing section 140 of FIG. 2. The wing section 140 in the illustrated example embodiment defines the cavity 31 therein, with the cavity 31 being sufficiently sized and shaped to receive an actuator housing 50H. The actuator housing 50H could be embodied as a cube-shaped outer shell or other suitable structure protecting the actuator 50 contained therein from moisture, dirt, and debris.

To transmit the drive torque (arrow T) to the mechanical linkage 52 of FIG. 2, the crankshaft 54 may be coupled to the actuator 50 via a rotary shaft 57, e.g., via a splined connection (not shown), such that rotation of the rotary shaft 57 by the energized actuator 50 causes the crankshaft 54 to rotate. At a distal end of the crankshaft 54, a revolute joint 55 connects to the mechanical linkage 52. Thus, rotation of the crankshaft 54 extends or retracts the servo tabs 34 as needed.

Figure 5:
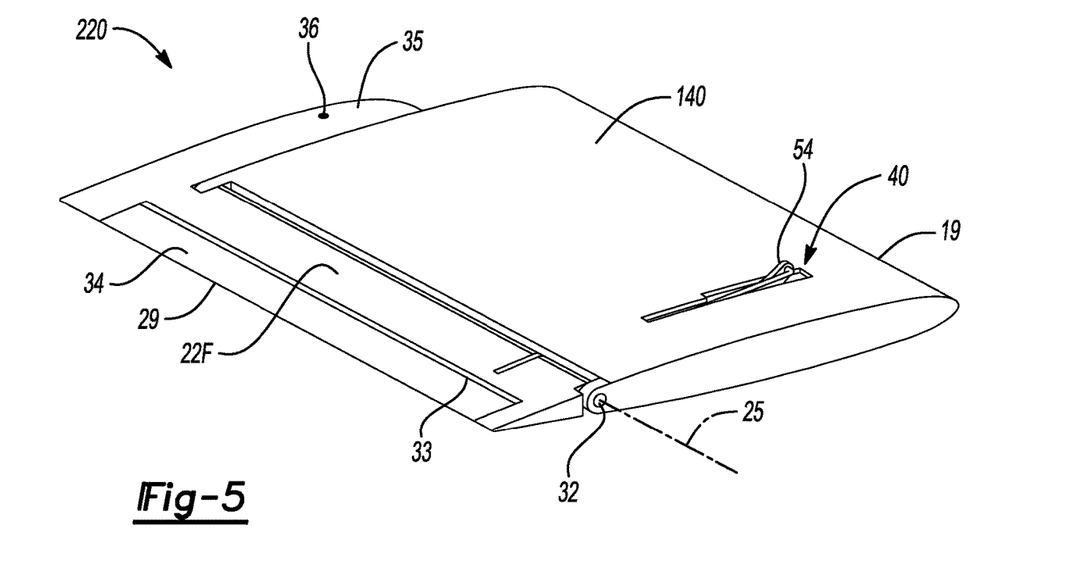

FIGS. 4 and 5 together depict the passive gust load alleviation (PGLA) device 220 according to a non-deployed state, i.e., a steady-state attitude in the absence of a gust load, with FIG. 4 showing the wing section 140 in side view with the optional actuator 50 disposed within the cavity 31 as described above. That is, the counterweight 35 is in an equilibrium position and thus is not deflected or deployed relative to the axis of rotation 25. A small gap 33 (FIG. 5) may exist between the servo tab 34 and the free-floating aerodynamic control surface 22F (the aileron 22 in this embodiment) depending on the presence or absence of drive torque (arrow T of FIG. 3) from the actuator 50 acting on the servo tab 34. In FIG. 4, for instance, the crankshaft 54 may be rotated to a full-stop position to lock the servo tab 34, thus aligning the servo tab 34 with the general plane of the free-floating aerodynamic control surface 22F.

Figure 7:
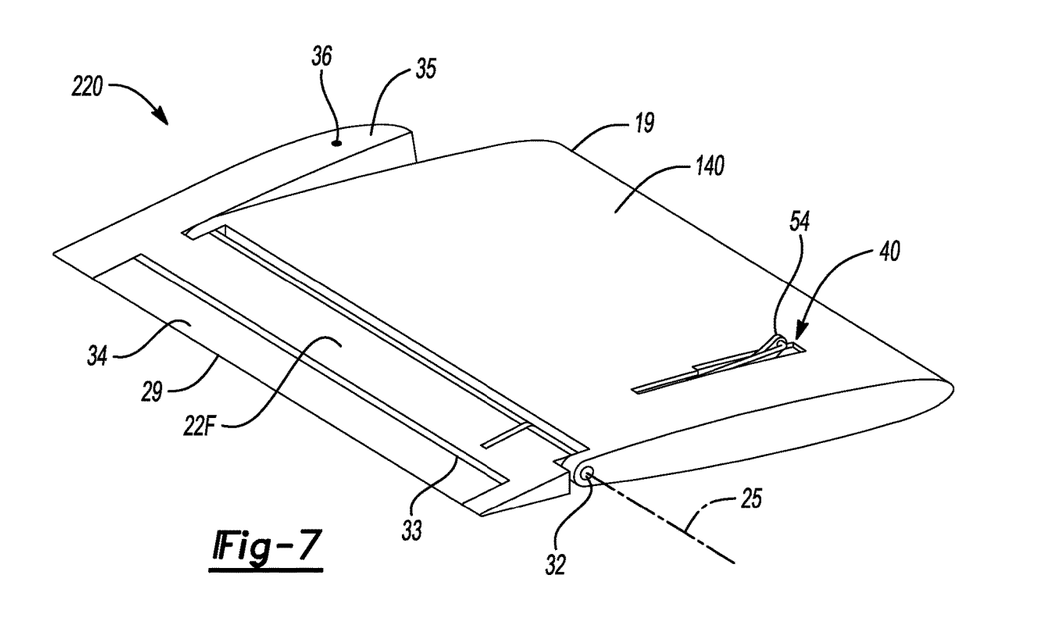

As shown in FIGS. 5 and 6, deflection of the passive gust load alleviation (PGLA) device 220 results due to resulting gravitational physics when an incident wind gust exerts a gust load on the wing section 140. That is, due to the predetermined placement of the center of gravity 36 forward of the axis of rotation 25, the free-floating aerodynamic control surface 22F deflects downward. The gap 33 may remain present between the servo tab 34 and the aerodynamic control surface 22F, once again depending on the presence or absence of the drive torque (arrow T of FIG. 3) from the actuator 50. That is, actuation of the optional servo tab 34 on a given aerodynamic control surface 22F in the non-limiting example embodiment of FIG. 7 is independent of a state of deployment of the PGLA device 220.

Figure 8:
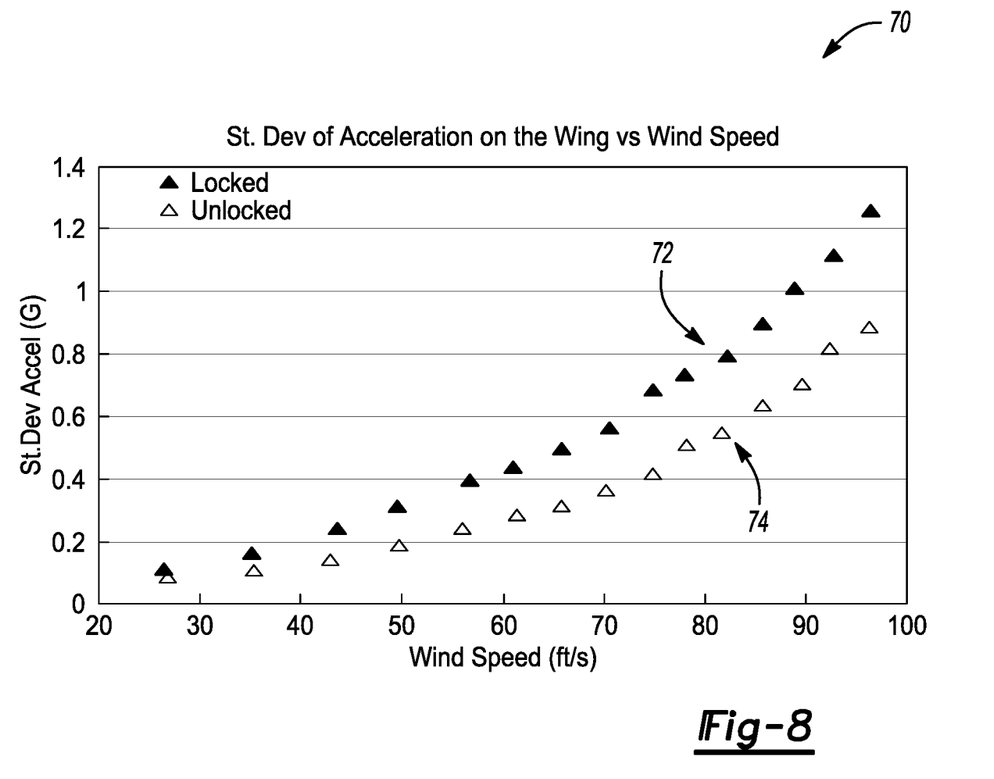
FIG. 8 is a plot of representative gust load-based acceleration forces acting on a representative wing of an aircraft, with the indicated data acquired from a representative experiment with the present PGLA device comprising 25% of the wingspan.

FIG. 8 depicts a plot 70 of the relative effects of the passive gust load alleviation (PGLA) device 220 on wind gust-induced acceleration of the wing 14, equipped with the free-floating aerodynamic control surface 22F in the exemplary form of an aileron 22. The trajectory line 72 of a "locked" state corresponds to a wing 14 in which the aileron 22 is not free to passively deflect in response to an incident gust load. The angular attitude of the passive GLA device 220 in such a locked state would appear approximately as shown in FIG. 2.

In contrast, the trajectory line 74 of an "unlocked" state corresponds to the free deflection of the PGLA device 220 in response to an incident wind gust. As shown in the representative scenario, trajectory lines 72 and 74 illustrate increasing acceleration forces (G) in terms of standard deviation thereof, for a representative range of wind speeds of 20 ft/s to 100 ft/s. FIG. 8 therefore illustrates possible reductions in acceleration forces on the wing 14 of about 30% due to deflection of the passive GLA device 220.

The substantial reductions in gust-related loading of an aerodynamic panel using the above-described PGLA device 220 have several notable benefits. One such benefit is the reduction in dynamic loads experienced by the aerodynamic panel, e.g., the wing 14, which enables construction of wings 14 having an ultra-high aspect ratio, i.e., the ratio of the length of the wing 14 to its width, as appreciated in the art. Such wings 14, absent the present teachings, remain weight-prohibitive due to large gust-load design requirements. That is, aerodynamically high aspect ratio wings 14 have the noted benefit of reducing induced drag. However, wings 14 having such a construction are also much more susceptible to loading, including loads attributed to incident wind gusts. The present PGLA device 220 may therefore be used as an enabling technology to manufacture higher aspect ratio wings 14 as a possible benefit.

Additionally, the present solutions enable the elimination of active controls and advanced algorithms for gust load alleviation, which in turn should simplify certification relative to efforts used to certify active solutions. Other potential benefits include a corresponding improvement in ride quality and passenger comfort, particularly when traveling through turbulent air.

As will be appreciated by those skilled in the art in view of the foregoing disclosure, the present teachings enable a corresponding method for alleviating gust loads on an aircraft panel, e.g., the above-described aerodynamic panel 140 attached to the fuselage 12 of FIG. 1. In an embodiment, such a method may include connecting the free-floating aerodynamic control surface 22F, via the revolute joint 32 of FIG. 2, along the trailing edge 29 of the aircraft panel. The free-floating aerodynamic control surface 22F has a counterweight 35 which, as best shown in FIGS. 2, 5, and 7, has a center of gravity 36 located forward of the axis of rotation 25 of the revolute joint 32. Such a method may also include, during flight of the aircraft 10 having the equipped aircraft panel, deflecting the free-floating aerodynamic control surface 22F about the axis of rotation 25 in response to an incident wind gust to thereby alleviate the gust load.

In a possible configuration, the aircraft panel is a wing 14 of the winged aircraft 10, an example of which is depicted in FIG. 1. In such an embodiment, the free-floating aerodynamic control surface 22F is a free-floating aileron 22, and connecting the free-floating aerodynamic control surface 22F, via the revolute joint 25, along the trailing edge 29 of the aircraft panel includes connecting the free-floating aileron 22 along a portion or all of a wingspan of the wing 14, e.g., at least 25% of the wingspan or length of the wing 14.

The method may include connecting the servo tab 34 to the free-floating aileron 22 and to an actuator 50 having a dynamic output state that is responsive to an electronic control signal (arrow $CC_{34}$), with the method in such an embodiment including transmitting the electronic control signal (arrow $CC_{34}$) to the actuator 50 via the processor (P) of FIG. 3 to thereby deploy the servo tab 34 and selectively impart an aerodynamic moment to the free-floating aileron 22. Some embodiments of the method include connecting the rotary spring 41 of FIG. 2 to the revolute joint 32, with the rotary spring 41 providing a frequency response that is tuned or tunable to a predetermined oscillating frequency of the wing 14 or other aircraft panel to which the PGLA device 220 is connected.

Aspects of the present disclosure have been described in detail with reference to the illustrated embodiments. Those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. A passive gust load alleviation device for an aerodynamic panel, comprising:
    a revolute joint having an axis of rotation;
    a free-floating aerodynamic surface operatively connected along a trailing edge of the aerodynamic panel via the revolute joint, wherein the free-floating aerodynamic surface is configured to move about the axis of rotation without controllable actuation force being applied to the free-floating aerodynamic surface; and
    a counterweight operatively connected to the free-floating aerodynamic surface, wherein the counterweight and the free-floating aerodynamic surface together have a center of gravity located forward of the axis of rotation relative to a direction of ambient airflow across the aerodynamic panel, and wherein the counterweight is configured to passively deflect the free-floating aerodynamic surface about the axis of rotation in response to an incident wind gust to thereby alleviate a gust load on the aerodynamic panel resulting from the incident wind gust.

2. The device of claim 1, wherein the aerodynamic panel is a wing section of an aircraft wing, and the free-floating aerodynamic surface is a free-floating trailing-edge aerodynamic surface of the wing section.

3. The device of claim 1, further comprising:
    a servo tab operatively connected to the free-floating aerodynamic surface and configured to impart an aerodynamic moment thereto for control of a vehicle equipped with the aerodynamic panel.

4. The device of claim 3, further comprising:
    an actuator connected to the servo tab, and having a dynamic output state that is responsive to an electronic control signal from a processor for modal or vibration suppression.

5. The device of claim 4, further comprising:
    one or more mechanical linkages connected to the actuator and to the servo tab, and configured to transmit torque from the actuator to the servo tab to thereby cause the servo tab to impart the aerodynamic moment to the free-floating aerodynamic surface.

6. The device of claim 5, wherein the aerodynamic panel defines a cavity therein, the device further comprising:
    an actuator housing positioned within the cavity and containing the actuator therein.

7. The device of claim 1, wherein the aerodynamic panel is a component of an aircraft empennage assembly, and wherein the aerodynamic surface is an elevator or a rudder of the aircraft empennage assembly.

8. The device of claim 1, further comprising:
    a rotary spring coupled to the revolute joint and providing a frequency response tuned to a predetermined oscillating frequency of the aerodynamic panel.

9. A vehicle comprising:
    a vehicle body;
    an aerodynamic panel connected to the vehicle body and extending into an ambient airflow;
    a revolute joint connected to the aerodynamic panel and having an axis of rotation;
    a free-floating aerodynamic surface operatively connected to the aerodynamic panel via the revolute joint, wherein the free-floating aerodynamic surface is configured to move about the axis of rotation without controllable actuation force being applied to the free-floating aerodynamic surface; and
    a counterweight operatively connected to the free-floating aerodynamic surface, wherein the counterweight and the free-floating aerodynamic surface together have a center of gravity located forward of the axis of rotation, and wherein the counterweight is configured to passively deflect the free-floating aerodynamic surface about the axis of rotation in response to a wind gust to alleviate a gust load on the aerodynamic panel resulting from the wind gust.

10. The vehicle of claim 9, wherein the vehicle is a winged aircraft and the vehicle body is a fuselage of the winged aircraft.

11. The vehicle of claim 10, wherein the aerodynamic panel is an aircraft wing section, and the free-floating aerodynamic surface is a free-floating aileron or flaperon connected to the aircraft wing section.

12. The vehicle of claim 11, further comprising:
a servo tab connected via a joint to a trailing edge of the free-floating aileron or flaperon;
an actuator connected to the servo tab; and
a processor configured to transmit an electronic control signal to the actuator to cause the servo tab to deploy into the ambient airflow and selectively impart an aerodynamic moment to the free-floating aileron or flaperon.

13. The vehicle of claim 12, further comprising:
one or more mechanical linkages connected to the actuator and to the servo tab, and configured to transmit torque from the actuator to the servo tab to thereby cause the servo tab to impart the aerodynamic moment to the free-floating aileron or flaperon.

14. The vehicle of claim 13, wherein the aircraft wing section defines a cavity, the vehicle further comprising:
an actuator housing positioned within the cavity, wherein the cavity contains the actuator therein.

15. The vehicle of claim 10, wherein the aerodynamic panel is a component of an empennage assembly of the winged aircraft, and wherein the free-floating aerodynamic surface is an elevator or a rudder of the empennage assembly.

16. The vehicle of claim 9, further comprising:
a rotary spring coupled to the revolute joint and configured to provide frequency response tuned to a predetermined oscillating frequency of the aerodynamic panel.

17. A method for alleviating a gust load from an incident wind gust on an aircraft panel, comprising:
connecting a free-floating aerodynamic panel, via a revolute joint, along a trailing edge of the aircraft panel, the free-floating aerodynamic surface having a counterweight extending forward of an axis of rotation of the revolute joint, and the counterweight and the free-floating aerodynamic surface together having a center of gravity located forward of an axis of rotation of the revolute joint; and
during a flight of a winged aircraft having the aircraft panel, enabling the free-floating aerodynamic surface to move about the axis of rotation without controllable actuation force being applied to the free-floating aerodynamic surface to passively deflect the free-floating aerodynamic panel about the axis of rotation in response to the incident wind gust to thereby alleviate the gust load on the aircraft panel.

18. The method of claim 17, wherein the aircraft panel is a wing of the aircraft, the free-floating aerodynamic panel is a free-floating aileron or flaperon, and connecting the free-floating aerodynamic panel, via the revolute joint, along the trailing edge of the aircraft panel includes connecting the free-floating aileron or flaperon along a portion or all of a wingspan of the wing.

19. The method of claim 18, further comprising:
connecting the servo tab to the free-floating aileron or flaperon and to the actuator, the actuator having a dynamic output state that is responsive to an electronic control signal, the method further comprising:
transmitting the electronic control signal to the actuator via a processor to thereby deploy the servo tab into an ambient airflow and thereby selectively impart an aerodynamic moment to the free-floating aileron or flaperon.

20. The method of claim 18, further comprising:
connecting a rotary spring to the revolute joint, the rotary spring providing a frequency response tuned to a predetermined oscillating frequency of the wing.

* * * * *